United States Patent Office 3,558,266
Patented Jan. 26, 1971

3,558,266
POLYURETHANE COMPOSITION STABLED TO GAS FADING AND PROCESS FOR PREPARING SAME
Alois Kleemann and Ernst Model, Basel, Switzerland, assignors to Geigy Chemical Corporation, Greenburgh, N.Y., a corporation of Delaware
No Drawing. Filed Oct. 10, 1966, Ser. No. 585,291
Claims priority, application Switzerland, Oct. 14, 1965, 14,199/65
Int. Cl. D06p 3/24, 5/00
U.S. Cl. 8—165                                      4 Claims

ABSTRACT OF THE DISCLOSURE

Fastness to gas fading of dyeings and plastics sensitive thereto is improved by treatment with:

$$R_1-N\begin{pmatrix}CH_2-CH_2\\CH_2-CH_2\end{pmatrix}N-X-N\begin{pmatrix}CH_2-CH_2\\CH_2-CH_2\end{pmatrix}N-R_2$$

---

The present invention concerns a process to improve the fastness to gas fading of dyeings and plastics which are sensitive thereto and, as industrial product, the dyeings and plastics improved by this process, as well as compositions containing compounds which inhibit gas fading and the compounds themselves.

It has been found that the fastness to gas fading of dyeings and plastics which are sensitive thereto can be improved by treating them with a compound of the formula $$R_1-N\begin{pmatrix}CH_2-CH_2\\CH_2-CH_2\end{pmatrix}N-X-N\begin{pmatrix}CH_2-CH_2\\CH_2-CH_2\end{pmatrix}N-R_2 \quad (I)$$

wherein $R_1$ and $R_2$ each represent an aliphatic, cycloaliphatic, araliphatic or aromatic radical, and
X represents the direct bond or a non-coloring bridging member.

If $R_1$ and $R_2$ represent an aliphatic radical then this preferably contains at least 6 carbon atoms, preferably from 6 to 18 carbon atoms. The aliphatic radical can contain non-ionogenic and non-coloring substituents e.g. alkoxy groups, halogens such as fluorine, chlorine or bromine or the cyano group; however, unsubstituted saturated and unsaturated alkyl is preferred.

Preferred aliphatic radicals are n-alkyl groups such as the n-hexyl, n-octyl, n-decyl, n-dodecyl, n-tetradecyl, oleyl or n-octadecyl.

If $R_1$ and $R_2$ represent a cycloaliphatic or an araliphatic radical then this is principally cyclohexyl, lower alkyl cyclohexyl, benzyl, lower alkyl benzyl, chloro-benzyl or bromo-benzyl. Preferred are cyclohexyl and benzyl.

If $R_1$ and $R_2$ represent an aromatic radical then this is, in particular, phenyl, lower alkyl phenyl, bromo phenyl, chloro phenyl, fluoro phenyl, naphthyl, chloro naphthyl, bromo naphthyl or lower alkyl naphthyl. Preferred are phenyl and naphthyl.

$R_1$ and $R_2$ can be different from each other; preferably they are both the same aromatic radical, particularly a radical of the benzene series.

In the substances of Formula I usable according to the invention, the aromatic rings can be unsubstituted or non-ionogenically substituted; the substituents, however, should not have coloring properties. The principal substituents are lower alkyl groups such as methyl or ethyl, lower alkoxy groups such as methoxy or ethoxy, or halogen such as fluorine, chlorine or bromine.

X representing a non-coloring bridging member is selected from among:

(a) an alkylene radical which can contain non-ionogenic and non-coloring substituents,
(b) an aliphatic bridging member consisting of hydrocarbon radicals linked by hetero atoms, particularly O, S or —NR'— wherein R' is hydrogen or lower alkyl;
(c) the acyl radical of a colorless dibasic acid or a cycloalkylene radical, or
(d) the group —(S)$_x$— wherein $x$ is an integer of from 1 to 6.

Alkylene groups according to (a) can have straight or branched chains. α,ω-alkylene radicals containing 1 to 14 carbon atoms are preferred, e.g. the methylene, 1,2-ethylene, 1,3-propylene, 1,4-butylene or 1,14-tetradecylene radical. Examples of alkylene radicals having branched chains are the ethylidene, propylidene, 2,2-propylene, 2,2-butylene or 1,2-propylene radical. As non-ionogenic and non coloring substituents the alkylene radical can contain, e.g. an aromatic radical, particularly phenyl or benzyl which may be substituted by halogen such as fluorine, chlorine or bromine, lower alkyl or lower alkoxy in the nucleus. The alkylene from 3 to 10 carbon atoms may also contain hydroxy whereby the hydroxy group is preferably not at a terminal carbon atom. Examples of alkylenes so substituted are phenylmethylene, 1-phenyl-ethylidene or 2-hydroxy-1,3-propylene.

Aliphatic bridging members according to (b) consisting of hydrocarbon radicals linked by hetero atoms are, e.g. the radicals: —CH$_2$CH$_2$OCH$_2$CH$_2$—,

—CH$_2$CH$_2$SCH$_2$CH$_2$—, —CH$_2$CH$_2$SOCH$_2$CH$_2$—

—CH$_2$CH$_2$SO$_2$CH$_2$CH$_2$— or

—CH$_2$CH$_2$NCH$_2$CH$_2$—
         |
         R' whereby R' is preferably hydrogen but it can also be a lower alkyl group. The preferred length of the oxa-alkylene and thio-alkylene is from 2 to 20 carbon atoms whereby each oxygen or sulfur atoms is separated by at least one carbon atom from the chain end and by at least 2 carbon atoms from any further oxygen or sulfur atoms.

Acyl radicals can be derived from an inorganic or organic dibasic acid. In the former case these radicals are, e.g. —CO—, —CS—, —C(=NH)—, —SO—, —SO$_2$— or —(S)$_x$— wherein $x$ is an integer of from 1 to 6. In the radicals with structures like —(CH$_2$)$_n$—S—(CH$_2$)$_n$, —(CH$_2$)$_n$—SO—(CH$_2$)$_n$ or —(CH$_2$)$_n$—SO$_2$—(CH$_2$)$_n$, $n$ is an integer of from 1 to 10. If the acyl radical is derived from an organic dibasic acid it is, e.g. the radical —COCO—, the radical of an alkane dicarboxylic acid, e.g. a radical of the formula —CO(CH$_2$)$_n$CO—, whereby $n$ is preferably 1 to 10, the radical of an aromatic dicarboxylic acid, e.g. the radicals $$-CO-\underset{}{\bigcirc}-CO- \quad \text{or} \quad -CO-\underset{}{\bigcirc}\overset{CO-}{\underset{}{|}}$$

or the radical of a cycloaliphatic dicarboxylic acid such as the radical $$-CO-\underset{h}{\bigcirc}-CO-$$

As cycloalkylene radical, X represents, in particular, the 1,1-, 1,2- or 1,4-cyclohexylene radical.

In preferred compounds of Formula I, X represents the methylene or the ethylene radical and $R_1$ and $R_2$ the phenyl radical.

Some of the compounds of Formula I usable according to the invention are known. They are obtained, for example, by reacting correspondingly N-substituted piperazines with a bifunctional compound introducing the bridging member X, for example, with an oxo compound such as an aldehyde, particularly one of the aliphatic or aromatic series, or with a ketone, namely an aliphatic, araliphatic-aromatic or cyclic ketone, with an alkylene dihalide the alkylene radical of which can contain non-ionogenic and non-colouring substituents, particularly a $\omega,\omega'$-alkylene dichloride, with an alkylene oxide containing halogen such as epichlorohydrin, with a bis-(halogenoalkyl)-ether, -thioether and its oxidation products, or bis-(halogenoalkyl)-amine, e.g. bis-($\beta$-chloroethyl)-ether, -thioether, -sulphoxide, -sulphone or -amine, with a reactive derivative of a dibasic, non-colouring acid, particularly an acid dichloride such as phosgene, thiophosgene, thionyl chloride, sulfuryl chloride, oxalic acid dichloride or with an alkane dicarboxylic acid dichloride, -dibromide, or -diester, with an aromatic dicarboxylic acid dichloride, with a cyanogen halide, particularly cyanogen chloride or bromide, or with a cycloalkylene dichloride.

Dyeings which are sensitive to gas fading, particularly cellulose ester, or polyurethane dyeings, are treated preferably with an aqueous dispersion of compounds of Formula I. As dispersing agents, the aqueous dispersion contains for example, fatty alcohol or alkylphenol polyglycol ethers having a lipophilic radical containing 8 to 20 carbon atoms and having 10 to 30 alkyleneoxy, particularly ethyleneoxy groups. The fiber material mentioned can be pre-treated with this dispersion and then dyed, or the active substances of Formula I can be added to the dyebath and dyeing and gas fading inhibiting can be effected in one process, or finally, the dyed fiber material can be after-treated with the dispersion.

It is also possible to incorporate the active substances of Formula I into the spinning masses.

To protect elastomeric polyurethanes which are sensitive to gas fading from such injury, particularly to reduce the yellowing of Spandex fibres (long chain synthetic polymer which contains at least 85% of a segmented polyurethane), these plastics are treated with a solution or dispersion of compounds of Formula I. Suitable solvents for this purpose are, in particular, aliphatic alcohols, mainly lower alkanols such as methanol, ethanol, n-propanol or isopropanol; suitable dispersing agents are, e.g. those given above.

Dyeings on cellulose esters and polyurethanes which have been treated with compounds of Formula I are more resistant to the influence of industrial fumes, namely nitric oxides, than untreated dyeings. Also, elastomeric polyurethanes treated with these active substances are substantially protected from yellowing due to industrial fumes. The compounds of Formula I to be used according to the invention are superior to previously known active substances of similar constitution with regard to their very much better light fastness.

The compounds of Formula I have hardly any injurious effect on the light fastness of the dyeings on the materials mentioned which have been treated therewith.

The following list gives examples of active substances usable according to the invention for the improvement of fastness to gas fading of dyeings and plastics.

In order to attain a satisfactory degree of gas fading inhibition in the dyeings and plastics to be protected, it is necessary to incorporate therein from about 0.5 to 5% and preferably from about 0.75 to 2.0% of a gas fading inhibiting compound of Formula I.

LIST OF ACTIVE SUBSTANCES

General formula

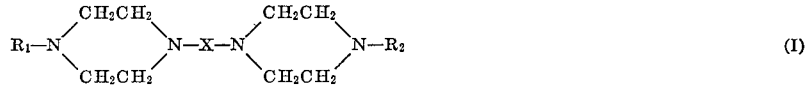

(I)

[I. Symmetrical Compounds, (i.e. $R_1 = R_2 = R$)]

Production by reaction of 2 mols of the compound

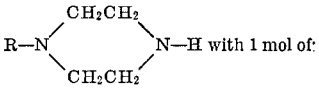 with 1 mol of:

| Number | Active substance R | X | or production described in: |
|---|---|---|---|
| 1 | phenyl | —CH$_2$— | J. Am. Chem. Soc. 78, 482–4 (1956). |
| 2 | Same as above | —CH$_2$CH$_2$— | J. Am. Chem. Soc. 57, 1,788, 1,789, 2,362, 2,364 (1935). |
| 3 | do | —CH$_2$CH$_2$CH$_2$— | J. Org. Chem. 24, 764–7 (1959). |
| 4 | CH$_3$—phenyl | —CH$_2$— | J. Org. Chem. 24, 764–7 (1959). |
| 5 | Cl—phenyl | —CH$_2$— | J. Org. Chem. 24, 764–7 (1959). |
| 6 | phenyl | —(CH$_2$)$_6$— | 1,6-hexylene dichloride. |
| 7 | Same as above | —(CH$_2$)$_8$— | 1,8-octylene dichloride. |
| 8 | do | —(CH$_2$)$_{10}$— | 1,10-decylene dichloride. |
| 9 | do | —CH(CH$_3$)— | Acetaldehyde, J. Am. Chem. Soc. 57, 2,363 (1935). |

Production by reaction of 2 mols of the compound $$R-N\begin{matrix}CH_2CH_2\\ \\CH_2CH_2\end{matrix}N-H$$ with 1 mol of:

| Number | Active substance R | Active substance X | or production described in: |
|---|---|---|---|
| 10 | do | —CH—<br>　\|<br>　CCl₃ | Chloral (hydrate). |
| 11 | do | —CH—(phenyl) | J. Am. Chem. Soc. 57, 1,788, 1,789, 2,363, 2,364 (1935). |
| 12 | do | —CH—(phenyl-CH₃) | J. Am. Chem. Soc. 57, 1,788, 17,789, 2,363, 2,364 (1935). |
| 13 | do | —CH—(phenyl-OCH₃) | J. Am. Chem. Soc. 57. 1,788, 1,789, 2,363, 2,364 (1935). |
| 14 | do | CH₃<br>　\|<br>—C—<br>　\|<br>CH₃ | Acetone. |
| 15 | do | CH₃<br>　\|<br>—C—(phenyl) | Acetophenone. |
| 16 | do | cyclohexylidene | Cyclohexanone. |
| 17 | do | —CH₂—CH—CH₂—<br>　　　　\|<br>　　　　OH | Epichlorohydrin: |
| 18 | do | —CH₂CH₂OCH₂CH₂— | β,β′-dichlorodiethyl ether, Arhiv Kem. 18, 87–98 (1946). |
| 19 | do | —CH₂CH₂SCH₂CH₂— | Bromoethylene derivative+Na₂S. |
| 20 | do | —CH₂CH₂SOCH₂CH₂— | Oxidation of No. 19. |
| 21 | do | —CH₂CH₂SO₂CH₂CH₂— | Do. |
| 22 | do | —CH₂CH₂—NH—CH₂CH₂— | N,N-bis-(β-chlorethyl)-amine, J. Am. Chem. Soc. 79, 2221 (1957). |
| 23 | do | —CH₂CH₂—N—CH₂CH₂—<br>　　　　\|<br>　　　　CH₃ | N,N-bis-(β-chlorethyl)-N-methylamine. |
| 24 | do | —CO— | Phosgene, C.A. 29, 29595. |
| 25 | do | —CS— | Thiophosgene. |
| 26 | do | —C=NH<br>　\| | Cyanogen chloride. |
| 27 | do | —SO— | Thionyl chloride. |
| 28 | do | —SO₂— | Sulphuryl chloride. |
| 29 | do | —S—S— |  |
| 30 | do | —COCO— | EP774570, oxalic acid ethyl ester. |
| 31 | do | —COCH₂CO— | Malonic acid diethyl ester. |
| 32 | do | —COCH₂CH₂—CO— | Succinic acid diethyl ester. |
| 33 | do | —CO(CH₂)₄—CO— | Adipic acid dichloride. |
| 34 | do | —CO(CH₂)₆CO— | Suberic acid dichloride. |
| 35 | do | —CO(CH₂)₇CO— | Azelaic acid dichloride. |
| 36 | do | —CO(CH₂)₈CO— | Sebacic acid dichloride. |
| 37 | do | —CO(CH₂)₁₀CO— | Dodecane diacid dichloride. |
| 38 | do | —CO—⟨phenyl⟩—CO— | Terephthalic acid. |
| 39 | do | —CO—⟨phenyl⟩—CO— (meta) | Isophthalic acid. |
| 40 | do | ⟨cyclohexyl⟩(—CO—)(—CO—) | Cyclohexane-1,2-dicarboxylic acid anhydride. |

| | Active substance | | Production by reaction of 2 mols of the compound 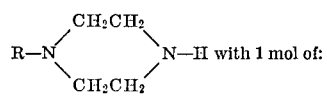 R—N(CH₂CH₂)(CH₂CH₂)N—H with 1 mol of: |
|---|---|---|---|
| Number | R | X | or production described in: |
| 41 | C₆H₅—CH₂— | —CH₂— | CA. 55, 5,507h (1961); |
| 42 | C₆H₅— | —CH₂— | Formaldehyde. |
| 43 | Dodecyl— | —CH₂— | Do. |
| 44 | Naphthyl— | —CH₂— | Do. |
| 45 | Naphthyl(other)— | —CH₂— | Do. |
| 46 | C₆H₅— | Direct bond | Oxydation with sodium hypochloride. |
| 47 | CH₃O—C₆H₄— | —CH₂— | Formaldehyde. |
| 47a | Hexyl | —CH₂— | Do. |
| 47b | Octadecyl | —CH₂— | Do. |

[II. Unsymmetrical Compounds (i.e. R₁≠R₂)]

| | Active substance | | |
|---|---|---|---|
| Number | R₁ | X | R₂ |
| 48 | C₆H₅— | —CH₂CH₂— | —CH₂—C₆H₅ |
| 49 | Same as above | —CH₂CH₂CH₂— | —C₆H₄—CH₃ |
| 50 | do | —CH₂— | —C₆H₄—OCH₃ |
| 51 | do | —CH₂CH₂— | —C₆H₄—Cl |

The unsymmetrical compounds Nos. 48–51 are produced by reacting 1 mol of N-bromoalkyl-N′-phenyl-piperazine with 1 mol of the compound.

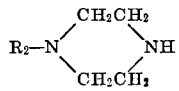

as is described, for example, in C.A. 54, 551f (1960).

The following examples illustrate the invention by showing the production of the compounds as well as their use. The temperatures are given therein in degrees centigrade. C.I. means Color Index, published by the Society of Dyers and Colourists, Dean House, Piccadilly, Bradford, Yorkhire, England, with acknowledgement to the American Association of Textile Chemists and Colourists, Lowell, Mass. U.S.A.

EXAMPLE I

Cellulose acetate fabric is treated for 30 minutes at 40° with a dispersion consisting of 50% by weight of water and 50% by weight of ethanol, which dispersion contains 0.7% (calculated on the weight of the goods) of active substance No. 1 of the above list and 1% of addition product of 20 mols of ethylene oxide and cetyl alcohol. An aqueous dispersion of 0.2% of dyestuff C.I. Disperse Blue 3 (61505) is added to this solution.

The treatment bath is raised within 30 minutes from 40° to 80° and is kept for another 45 minutes at this temperature. The sample is then rinsed and dried.

As a comparison, another sample of the same cellulose acetate fabric is dyed in the same way as described above with the same dyestuff but without the active substance.

The dyed samples, together with a test fabric (gas fading control sample No. 1 of Test Fabrics Inc. 55 Vandam St. New York 13, N.Y.), are placed in a container and exposed to the combustion gases of a coal gas flame at 40–45° while excluding light (American Standard Method L 14–54–1951) until the test fabric has changed from blue to red.

The fabric treated with active substance No. 1, after exposure, shows practically no change in shade, whilst the comparative sample shows a very strong change from blue to red.

Similar effects are obtained using the other active substances Nos. 2–51 given in the above list with otherwise the same procedure as described.

EXAMPLE II

A solution of 15 g. of cellulose acetate, 0.15 g. of active substance No. 2 and 0.03 g. of 1-phenylamino-4-aminoanthraquinone in 100 ml. of acetone is drawn into films of about 0.2 mm. thickness.

As a comparison, corresponding films are produced not containing the active substance. Samples of these films, together with an untreated test fabric (gas fading control sample No. 1) are exposed to the combustion gases of a coal gas flame under the same conditions as described in Example 1.

After exposure, the film containing active substance No. 2 shows no change in shade whereas the comparative sample not containing this substance shows a very strong change from blue to pink.

Similar results are attained with the other active substances given in the above list with otherwise the same procedure as described.

EXAMPLE III

Spandex fibre yarn ("Lycra," Du Pont de Nemours, Wilmington, Del. U.S.A.) is impregnated with a 1% solution of the active substance No. 1 in isopropanol at 20°, the yarn is centrifuged to 100% by weight and dried at 50–60°.

If this yarn is tested in the gas fading test procedure DIN=54025 (DIN=German Industry Norm) (testing with dilute nitrous gases), then the yellowing is noticeably less than that of untreated Spandex yarn.

EXAMPLE IV

Cellulose acetate fabric is treated for 30 minutes at 40° with a solution containing 1.5% (calculated on the weight of the goods) of compound No. 30 of the above list. (The solution containing compound No. 2 is prepared by mixing 1 part, by weight, of compound No. 2, 70 parts, by weight, of dimethylformamide, 1 part, by weight, of an addition product of 9 moles of ethylene oxide and nonyl phenol, and 28 parts, by weight, of water.) A dispersion of 0.2% of dyestuff C.I. Disperse Blue 1 (C.I. 64500) is added to the solution and the temperature raised to 80° within 30 minutes. The dye bath is kept at 80° for 45 minutes. The fabric is then rinsed and dried.

As a comparison, another sample of the same cellulose acetate fabric is dyed in the same way as described above with the same dyestuff, but without the addition of compound No. 2.

The two dyed samples are tested by exposing them to combustion gas as described in Example I. The fabric treated with compound No. 2, after exposure, practically does not show any change of its color shade, while the control sample shows a very strong change from blue to red.

EXAMPLE V

Cellulose acetate fabric is treated for 30 minutes at 40° with a suspension containing 2% (calculated on the weight of the goods) of compound No. 30 of the above list. (The suspension containing compound No. 30 is prepared by mixing 1 part, by weight, of compound No. 30, 70 parts, by weight, of dimethylformamide, 1 part, by weight, of oleylmethyl taurin and 28 parts, by weight, of water.) A dispersion of 0.2% of dyestuff C.I. Disperse Blue 2 (C.I. 61505) is added and the temperature of the dye bath is raised to 80° within 30 minutes. The dye bath is kept at 80° for 45 minutes. The fabric is then rinsed and dried.

As a comparison, another sample of the same cellulose acetate fabric is dyed in the same way as described above with the same dyestuff, but without the addition of compound No. 30 of the above list.

The two dyed samples are tested by exposing them to combustion gas as described in Example I. The fabric treated with compound No. 30, after exposure, practically does not show any change of its color shade, while the control sample shows a very strong change from blue to red.

EXAMPLE 1

Sebacic acid-di-[N'-phenyl piperazide]

A solution of 48 g. of sebacic acid dichloride in 88 ml. of absolute benzene is added dropwise to a mixture of 68 g. of phenylpiperazine and 44 g. of triethylamine in 360 ml. of dry benzene at a temperature of 20 to 30°. After two hours of stirring, the precipitated triethylamine hydrochloride is filtered off and the filtrate evaporated to dryness. The residue, which is sebacic acid-di-[N'-phenyl-piperazide] is recrystallized from acetic acid ester and melts at 115 to 117°.

EXAMPLE 2

Decamethylene di-[N'-phenylpiperazine]

8 g. of lithium aluminum hydride is suspended in 450 ml. of dry ether and 49 g. of sebacic acid di-[N'-phenyl-piperazide] is added while stirring vigorously and while excluding moisture. The reaction mixture is heated to boiling for 10 hours, and cooled down and poured onto ice. The precipitated crystals are filtered off and dissolved in acetone. The solution obtained is combined with the ethereal part of the filtrate and evaporated to dryness. After recrystallization from alcohol, the residue melts at 115 to 117° and gives an analysis the value of which corresponds with the values given for decamethylene di-[N'-phenylpiperazine].

EXAMPLE 3

Methylene bis-[N'-p-methoxyphenylpiperazine]

38 g. of p-methoxyphenylpiperazine are dissolved in 100 ml. of water. 8 g. of 37.8% formaldehyde solution are added dropwise while stirring at room temperature. A milk-like mixture is formed which converts rapidly to a pulpy precipitate. Stirring is continued for another hour at room temperature and the precipitate filtered off by suction. The precipitate is washed with water and dried in vacuo at 70°. A white powder is obtained.

EXAMPLE 4

Bis-(phenylpiperazine ethylene)-sulfide 86 g. of 1-phenyl-4-ω-bromoethyl-piperazine-dibromo-hydrate are dissolved in 1400 ml. of water while heating slightly. 52 g. of conc. sodium hydroxide solution are added with caution at room temperature whereby bromo-ethylphenylpiperazine precipitates. The precipitate is filtered off by suction and dissolved in 300 ml. of benzene. A solution of 24 g. of crystallized sodium sulfide containing 9 molecules of crystal water in a mixture of 20 ml. of water and 170 ml. of alcohol is added. The reaction mixture is then heated to boiling for four hours. The mixture separates into two layers. The aqueous phase is removed and the benzene phase is evaporated to dryness. The residue is recrystallized from methanol. The product obtained melts at 97°.

The corresponding sulfinyl and sulfonyl compounds are prepared by oxydizing the above-mentioned product with hydrogen peroxide.

EXAMPLE 5

Bis-phenylpiperazine thio-urea 33 g. of N-phenylpiperazine are dissolved in 350 ml. of water. The reaction mixture is phenolphthalein alkaline. At room temperature, 12 g. of thiophosgene are added dropwise while stirring. As soon as the solution is only litmus alkaline, 26 g. of concentrated sodium hydroxide solution is added dropwise in a way that the solution remains alkaline to litmus or slightly alkaline to phenolphthalein. A precipitate is obtained. In order to complete the reaction, the mixture is stirred for another hour at 50–60°. The precipitate is filtered off by suction, dried and recrystallized from acetic acid ester. The bis-phenyl-piperazine thio-urea so obtained melts at 177°.

EXAMPLE 6

Methylene-bis-cyclohexylpiperazine 34 g. of cyclohexylpiperazine is dissolved in 150 ml. of benzene and 3 g. of paraformaldehyde are added while stirring. Using a water separator, the mixture is boiled under reflux. As soon as water is no longer separated, the condensation is completed. The benzene mixture is evaporated to dryness and the residue recrystallized from a small amount of petroleum ether. White crystals being methylene-bis-cyclohexylpiperazine are obtained which melt at 101°.

EXAMPLE 7

Methylene-bis-laurylpiperazine 51 g. of lauryl piperazine are dissolved in 250 ml. of water and 150 ml. of methanol. 8 g. of 37.8% aqueous formaldehyde solution are added while stirring at room temperature. During the addition of the formaldehyde solution, a milk-like mixture is obtained and after a while a precipitate is observed. After the addition of the formaldehyde is completed, the precipitate is filtered off by suction and dried in vacuo. The methylene-bis-laurylpiperazine so obtained melts at 50° after recrystallization from petroleum ether.

EXAMPLE 8

1-phenylpiperazine-2-p-chlorophenyl-piperazino ethane 43 g. of 1-phenyl-4-ω-bromoethyl-piperazine-dibromohydrate are dissolved in 700 ml. of water while heating slightly. The mixture is cooled to room temperature and 26 g. of concentrated sodium hydroxide solution added cautiously until the mixture reacts strongly alkaline. A precipitate is obtained. The reaction mixture is covered with a layer of 150 ml. of benzene and the precipitate dissolved. The lower, aqueous layer is removed and to the benzene solution 40 g. of p-chloro-phenylpiperazine are added and the resulting mixture is heated to boiling in a vessel for 6 hours. The obtained precipitate is filtered off while the solution is still hot. On cooling, 1-phenyl-piperazine-2-p-chlorophenylpiperazino ethane precipitates in crystals, is filtered off by suction and dried. The melting point is 188°.

EXAMPLE 9

Methylene-bis-β-naphthylpiperazine 35 g. of β-naphthylpiperazine are dissolved in a mixture of 50 ml. of methanol and 40 ml. of water. 6.6 g. of 37.8% aqueous formaldehyde solution are admixed thereto dropwise at room temperature while stirring. On adding the formaldehyde solution the reaction mixture becomes immediately milky; after a while crystalline parts are formed. After all the formaldehyde has been added, stirring is continued for another hour and then the precipitate is filtered off by suction. The crude product is dried and recrystallized from benzene. The methylene-bis-β-naphthylpiperazine so obtained melts at 197°.

EXAMPLE 10

Bis-oxalic acid phenylpiperazide 162 g. of N-phenylpiperazine are mixed with 2 g. of sodium methylate and 73 g. of oxalic acid diethyl ester. For three hours the reaction mixture is heated to 150 to 160° in a vessel equipped with a declining condenser while stirring. The temperature is raised to 180° and stirring continued for another two hours at said temperature. During this period of heating, ethanol is distilled into the receiver bulb. The reaction mixture is then cooled down and 200 ml. of alcohol added at a temperature of 80° C. The precipitate is filtered off by suction and recrystallized from alcohol. The bisoxalic acid phenylpiperazide so obtained melts at 182°.

EXAMPLE 11

Malonic acid-bis-phenylpiperazide 162 g. of N-phenyl piperazine, 2 g. of sodium methylate, and 80 g. of malonic ester are mixed and heated to 140° in a vessel equipped with a declining condenser for one hour. The temperature is raised to 150° for another hour, and further raised to 160° for two more hours. The reaction mixture is cooled down and recrystallized from 2½ l. of methyl ethyl ketone. The so purified malonic acid bis-phenylpiperazide has a melting point of 188°.

As an analog to Example 11, succinic acid diethylester can be condensed with N-phenylpiperazine.

EXAMPLE 12

41 g. of N-phenyl piperazine are dissolved in 150 ml. of water and the mixture cooled to a temperature of 0°. At said temperature 135 ml. of a 13.3% by volume sodium hypochlorite solution are added dropwise while stirring. A precipitate is soon formed. After all hypochlorite solution has been added, the mixture is stirred for another hour at 0°. 81 g. of N-phenyl piperazine are added at 10° and the temperature raised to room temperature. The reaction mixture is mimosa alkaline. After a while the mixture converts to a dough-consistency which becomes gradually solid and grainy. At the same time, a slightly exothermic reaction is observed. As soon as the exothermic reaction is over, the solid material is filtered off by suction, dried and recrystallized from n-hexane. The bis-phenylpiperazine so obtained melts at 114°.

EXAMPLE 13

16 g. of N-phenylpiperazine are dissolved in 50 ml. of benzene. 9.2 g. of epichlorohydrin are added and the mixture is heated to 60° while stirring, whereupon the solution becomes turbid and a slight precipitate separates off. The reaction mixture is then boiled for one hour, a further amount of 33 g. of N-phenylpiperazine is added and the mixture boiled overnight. Thereupon a precipitate results. The reaction mixture is cooled and the precipitate is filtered off. The filtrate is exaporated to dryness in vacuo. A syrup remains which slowly crystallizes. Through recrystallization from n-hexane, 2-oxy-1,3-bis-phenylpiperazine is obtained which melts at 106°.

EXAMPLE 14

84 g. of N-phenylpiperazine are mixed with 42 g. of isophthalic acid in a flask equipped with a declining condenser. The mass is then heated to melting point and then further heated to 240° while stirring. Thereupon, water is distilled off into the receiver. The temperature is then raised to 260° and kept at that temperature for 2 hours. The mixture is then cooled and recrystallized from 250 ml. of dimethylformamide. The isophthalic acid-bis-phenylpiperazide so obtained melts at 177°.

EXAMPLE 15

38.5 g. of cis-hexahydrophthalic acid anhydride are mixed with 81 g. of N-phenylpiperazine in a flask equipped with a declining condenser. The reaction mixture is then heated to 240°. Thereby condensation is effected and water is distilled off into the receiver. The temperature is then raised to 260° and kept there for one hour. The reaction mixture is then cooled down and 250 ml. of methanol are added with caution at 80°. After 2 hours a precipitate separates off. The precipitate is then filtered off under suction and recrystallized from methanol. The cis-hexa-hydrophthalic acid-phenylpiperazide so obtained melts at 172°.

We claim:

1. A composition of matter resistant to gas fading and stable to washing comprising of a dyed polyurethane and from about 0.5 to 5% by weight of bis-piperazine having the formula:

$$R_1-N\begin{pmatrix}CH_2-CH_2\\CH_2-CH_2\end{pmatrix}N-X-N\begin{pmatrix}CH_2-CH_2\\CH_2-CH_2\end{pmatrix}N-R_2$$

wherein
  $R_1$ and $R_2$ are aromatic groups, and

X is selected from
- (a) a direct bond,
- (b) a divalent group having the formula $$-\text{alkylene}-\underset{R}{|}-$$

wherein R is hydroxy group, and
- (c) a divalent group having the formula

—alkylene—Y—alkylene wherein Y is S, SO, SO$_2$ or NR' and R' is lower alkyl.

2. A composition of claim 1 wherein said polyurethane is sensitive to industrial fumes.

3. A composition of claim 1 wherein said X is a group having the formula

—alkylene—Y—alkylene— where Y is O, S, SO$_2$ or NR' and R' is hydrogen or lower alkyl.

4. A process for improving the fastness of a dyed polyurethane which comprises incorporating in said polyurethane from about 0.5 to 5% by weight of a bis-piperazine of claim 1.

References Cited
UNITED STATES PATENTS

| | | | |
|---|---|---|---|
| 2,529,935 | 11/1950 | Grimmel et al. | 8—61 |
| 2,813,774 | 11/1957 | Schuster et al. | 8—61 |
| 3,318,806 | 5/1967 | Ernst | 260—268 |
| 3,370,044 | 2/1968 | Beaman | 8—55(E) |
| 3,376,264 | 4/1968 | Wieden et al. | 8—55(E) |

NORMAN G. TORCHIN, Primary Examiner

J. E. CALLAGHAN, Assistant Examiner

U.S. Cl. X.R.

260—268